United States Patent
Shimizu et al.

(10) Patent No.: US 6,498,702 B1
(45) Date of Patent: Dec. 24, 2002

(54) MAGNETIC HEAD SUPPORTING APPARATUS HAVING THERMALLY INSULATED READ/WRITE IC MOUNTED ON ARM PORTIONS THEREOF

(75) Inventors: Hayato Shimizu, Ryuugasaki (JP); Norio Nakazato, Kashiwa (JP); Masaaki Matsumoto, Fujisawa (JP); Yoshihiro Shiroishi, Hachiouji (JP); Mikio Tokuyama, Tsukuba (JP); Toshihiko Shimizu, Yasato (JP); Shigeo Nakamura, Odawara (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/510,339

(22) Filed: Feb. 22, 2000

(30) Foreign Application Priority Data

Feb. 22, 1999 (JP) .............................. 11-042657

(51) Int. Cl.⁷ .................................................. G11B 5/48
(52) U.S. Cl. .................................................. 360/244.1
(58) Field of Search .......................... 360/244.1, 244.5, 360/244.8, 245.8, 245.9

(56) References Cited

U.S. PATENT DOCUMENTS

| 5,245,489 | A | * | 9/1993 | Kimura et al. ............ 360/244.1 |
| 5,956,211 | A | * | 9/1999 | Adley ...................... 360/244.1 |
| 6,014,289 | A | * | 1/2000 | Goss ........................ 360/244.1 |
| 6,084,746 | A | * | 7/2000 | Shiraishi et al. ......... 360/244.1 |
| 6,144,530 | A | * | 11/2000 | Shiraishi et al. ......... 360/244.1 |
| 6,202,288 | B1 | * | 3/2001 | Shiraishi et al. ............ 29/603.3 |

FOREIGN PATENT DOCUMENTS

JP           3-187295      * 8/1991

* cited by examiner

*Primary Examiner*—Jefferson Evans
(74) *Attorney, Agent, or Firm*—Antonelli, Terry, Stout, Kraus, LLP

(57) ABSTRACT

A magnetic head supporting apparatus includes a magnetic head for reading and writing information on a magnetic disc, a slider having the magnetic head, and a suspension for supporting the slider. An IC chip for controlling a signal of the magnetic head is mounted on a first surface of a heat insulating substrate, and a second surface of the heat insulating substrate opposite to the first surface thereof is mounted to the suspension.

12 Claims, 5 Drawing Sheets

HEAD GIMBAL ASSEMBLY

HEAD GIMBAL ASSEMBLY

MAGNETIC HEAD SUPPORTING APPARATUS HAVING THERMALLY INSULATED READ/WRITE IC MOUNTED ON ARM PORTIONS THEREOF

BACKGROUND OF THE INVENTION

The present invention relates to a head supporting mechanism portion of a magnetic disc apparatus, and particularly to a head supporting apparatus in which an IC chip is mounted on an arm portion thereof and a magnetic disc apparatus using such a head supporting apparatus.

In the conventional magnetic disc apparatus, when improving a transfer speed, an impedance reduction occurs in a wire extending from a -read/write IC for controlling read/write signals to a magnetic read/write head. When the reduction occurs impedance, a distortion is generated in the signal and it is impossible to accurately read/write from or to the magnetic disc. Then, it is necessary to mount the read/write IC for amplifying the read/write signal as close to the magnetic head as possible.

Then, in JP-A-3-187295, there is disclosed a structure such that the read/write IC is directly mounted on the arm portion for supporting the magnetic head.

In this structure, heat radiating fins are formed in an arm portion (suspension) for supporting the head, thereby radiating heat from the read/write IC.

In the arm portion for supporting the magnetic head, it is necessary to make the mass thereof as light as possible and to make the moment of inertia thereof as small as possible for performing a high speed seeking operation. Further, in order to accurately position the magnetic head, the arm portion requires a suitable rigidity and should be substantially vibration proof. Accordingly, it is necessary to employ a compact and light weight IC for the read/write IC to be mounted on the arm portion for supporting the magnetic head on the other hand, it is necessary to make the magnetic head also compact and particularly it is necessary to supply a large amount of electric power at a time of writing information. As a result, since the read/write IC mounted on the arm for supporting the magnetic head consumes a large amount of electric power with a little volume, a temperature of the IC itself becomes very high is and there is a possibility that a thermal fracture will occur. Therefore, it is necessary to radiate the heat of the IC.

In the case of a structure for radiating the heat of the read/write IC by means of the radiating fins provided in the arm portion for supporting the head, there are the following problems.

Firstly, the arm portion for supporting the head is designed so as to make it compact and light, and therefore, when the heat is directly radiated to the arm portion, the arm itself is deformed due to a thermal expansion. As a result, an angle of attitude of the head is changed and a positioning accuracy is deteriorated Accordingly, the IC is mounted near a root portion of the arm where the thermal expansion of the arm can be ignored. However, this structure limits the degree to which the wire between the read/write IC and magnetic head can be shortened and thus runs counter to an original object thereof.

As mentioned above, in accordance with the conventional method of radiating the heat of the read/write IC by means of the radiating fins provided in the arm portion for supporting the magnetic head, there is a problem that the positioning accuracy of the magnetic head is deteriorated due to the deformation caused by the thermal expansion of the arm itself.

OBJECT AND SUMMARY OF THE INVENTION

Accordingly, an object of the present invention is to provide a head supporting apparatus which is structured so as to mount a read/write IC in an arm portion for supporting a head, radiate the heat of the read/write IC and generate no thermal expansion of the arm itself, and can be easily mounted.

In the head supporting apparatus of the present invention, a read/write IC chip is mounted on a heat insulating substrate, and the heat insulating substrate is mounted on a suspension and a heat radiating plate is mounted on a surface of the IC chip opposite to a surface toward the heat insulating substrate.

Further, bent portions are provided in the heat radiating plate and a bent portion in an upstream side, in which an air flow resulting from rotation of a magnetic disc collides with the heat radiating plate, is made longer than a bent portion in a downstream side, whereby air turbulence associated with the rotation of the disc is prevented.

DESCRIPTION OF THE EMBODIMENTS

Figure 1:
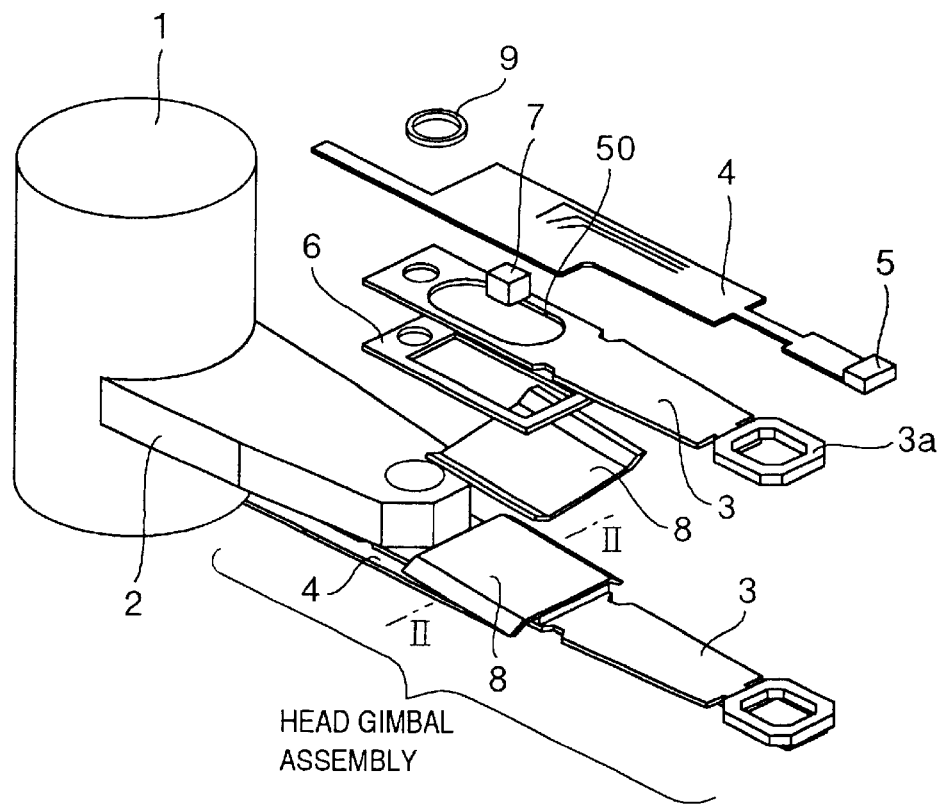
FIG. 1 is a perspective view showing an embodiment of a head supporting apparatus of the present invention.
Figure 2:
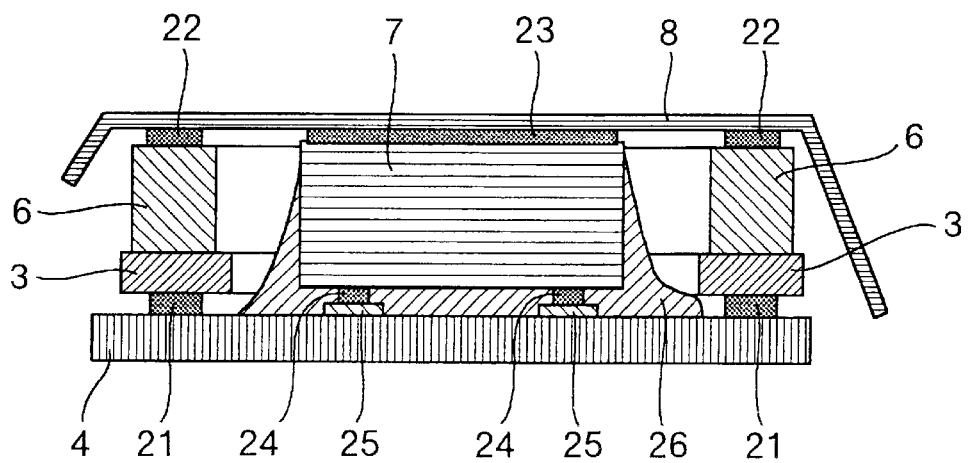
FIG. 2 is a cross sectional view taken along line II—II in FIG. 1.

A description will be given in detail of an embodiment of the present invention with reference to FIGS. 1 and 2. FIG. 1 is a view showing a structure of an embodiment of a head supporting apparatus of the present invention and FIG. 2 is a cross sectional view of an IC chip inserting portion of the embodiment shown in FIG. 1.

As shown in FIG. 1, a basic structure of the embodiment of a head supporting apparatus of the present invention comprises a hollow cylindrical rotary shaft 1 which is inserted and fixed onto a drive shaft provided on a magnetic disc apparatus, a base arm 2 which is mounted to the rotary shaft 1 and an arm suspension 3 which is mounted to the base arm 2 by fastening means 9. In the arm suspension 3, there is provided a gimbal 3a which, at a forward end, supports a slider having a read/write magnetic head 5 for recording and reproducing information on a magnetic disc. In the present embodiment, the slider having the magnetic head 5 is mounted to a wiring flexible print circuit board 4 (hereinafter, shortly refer to an FPC 4), and the magnetic head 5 is wired with an external portion of the head supporting apparatus by the FPC 4.

In this case, the slider may be mounted to a gimbal having a lower elasticity than the suspension 3 and provided in the suspension 3 in place of being directly mounted to the FPC 4. Further, the structure may be made such that the slider is directly provided in the suspension 3. In the above two cases, a wire between the magnetic head 5 and the FPC 4 may be performed by another wiring means in-place of being directly applied to the wiring pattern of the FPC 4. Further, in the present embodiment, the rotary shaft 1, the base arm 2, the suspension 3 and the slider are wholly called as the head supporting apparatus, however, there is a case of calling a head gimbal assembly mentioned below in FIG. 1 as the head supporting apparatus. Further, there is a case of calling a part between the base arm 2 and the slider as the head supporting apparatus. Here, in the present embodiment, the arm portion indicates the rotary shaft 1 and the base arm 2, however, may not include the rotary shaft 1.

A signal terminal of the head 5 is connected to the wire of the FPC 4 for transmitting the read/write signal and the like. An IC chip 7 for controlling a head signal and the like is connected to the FPC 4. A heat radiating plate 8 is provided in the IC chip 7. In this case, if the FPC 4 can give a predetermined elastic force, it is needless to say that the structure may be made such as to mount the slider to the FPC 4 as shown in FIG. 1. Further, a base load beam 6 for reinforcement is provided in the side of the base arm 2 of the suspension 3. This base load beam 6 may be omitted if a sufficient rigidity can be obtained only by the suspension 3.

In the present embodiment, the IC chip 7 is mounted to the FPC having a heat insulating property, that is, a heat insulating substrate, by bonding or the like.

In FIG. 1, a state after assembling the parts between the suspension 3 and the fastening means 9 is shown in a lower side of the drawing, and a state of disassembling them is shown in an upper side of the drawing. A structure obtained by assembling the elements 3 to 9 is called as a head gimbal assembly. Further, a structure obtained by mounting the head gimbal assembly to the base arm 2 is called as a head stack assembly. Accordingly, there is a case that two sets of head gimbal assemblies for an upper magnetic disc and a lower magnetic disc are provided in the head stack assembly to be inserted between the upper and lower magnetic discs.

The rotary shaft 1 rotates the head stack assembly by an external power (not shown) so as to move the magnetic head 5 to a target track on the magnetic disc.

A plurality of base arms 2 are bonded to the rotary shaft 1 or integrally formed with the rotary shaft 1 correspondingly to the number of the used magnetic discs. In the case that the base arm 2 is positioned between two magnetic discs, two sets of head gimbal assemblies are mounted to the base arm 2 by the fastening means 9. With respect to two magnetic discs holding one base arm 2 therebetween, the heads 5 provided in the respective head gimbal assemblies read/write the information on the surfaces facing the base arm 2. In this case, in a base arm 2 provided for an end magnetic disc of the magnetic discs stacked on the same rotary shaft, one set of head gimbal assembly is sufficient to be provided. Further, if possible, the head gimbal assembly may be directly fixed to the rotary shaft 1 and the base arm 2 may be omitted.

Figure 9:
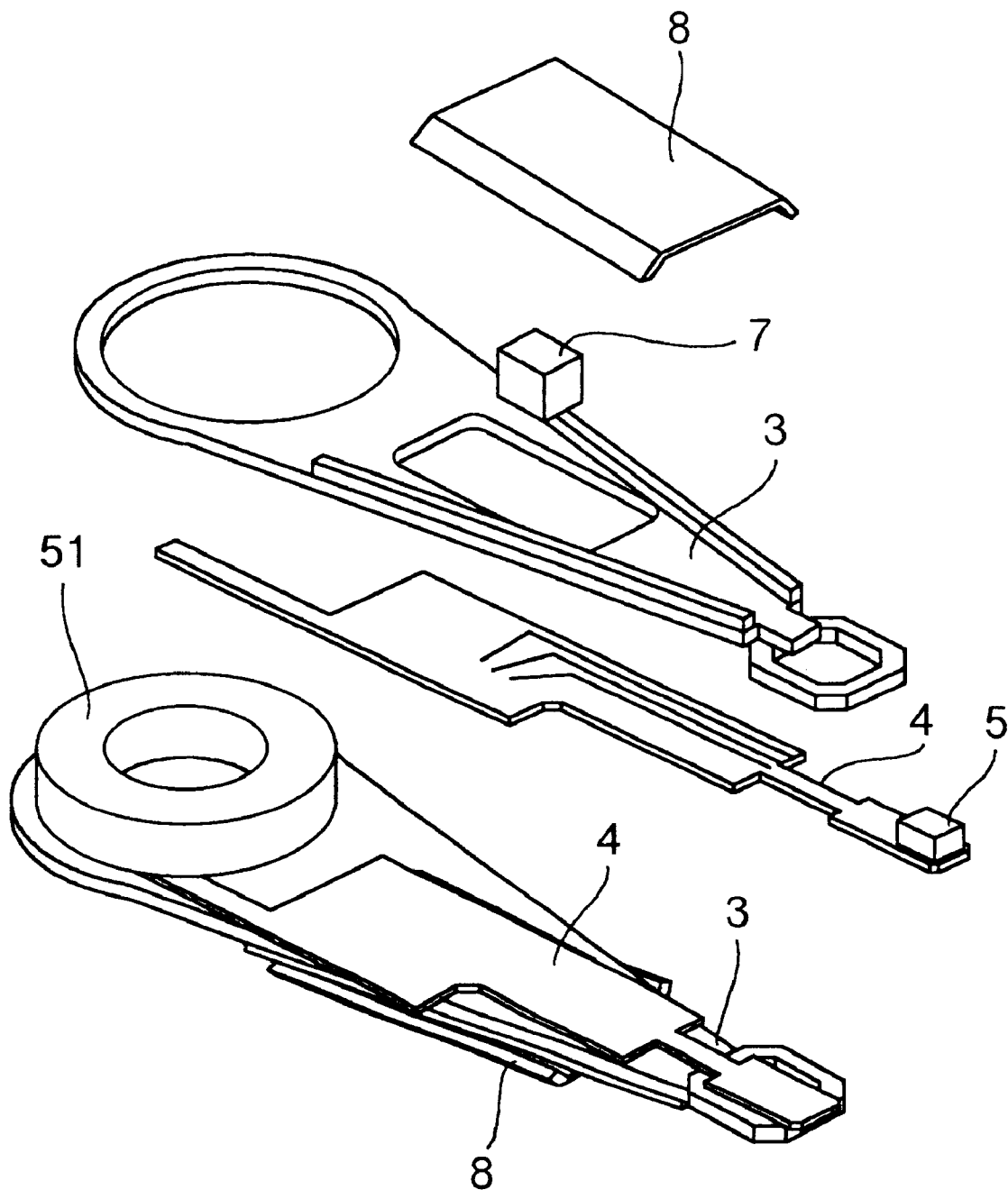
FIG. 9 is a view for explaining a structure of a head supporting apparatus of the other embodiment of the present invention.

As shown in FIG. 9, it is possible to form the suspension 3 by extending it to a portion of an insertion hole for the rotary shaft 1 and to stack the suspensions 3 on the rotary shaft 1 via spacers 51. In this case, no load beam is provided, so that there is an advantage that the number of the parts can be reduced.

The suspension 3 is an element for making the magnetic head 5 not to be shifted from the target track while maintaining a flying height of the magnetic head 5 from the magnetic disc at a constant. The base load beam 6 is a reinforcing member for increasing a rigidity of the suspension 3. The suspension 3 and the base load beam 6 may be integrally formed with each other. The suspension 3 may be constituted by a plurality of parts as occasion demands. As shown in FIG. 1, the suspension 3 is formed with a notch 50 at a side thereof for mounting to the base arm 2. This is provided for applying an elastic force which generates a force for pressing the slider provided with the magnetic head 5 to the magnetic disc surface. In this case, it is not always necessary to provide the base load beam 6.

The FPC 4 is provided for electrically connection with an external portion as well as electrically connection between the head 5 and the IC chip 7. In the present embodiment, the IC chip 7 is directly mounted on the FPC 4, however, the magnetic head 5 and the IC chip 7 may be wired by using a lead wire extended from the FPC 4. Further, in the present embodiment, a soft flexible printed circuit board 4 is used for mounting the IC chip 7, as a substrate having a wiring pattern. However, in the case that a softness is not specially required, the substrate having the wiring pattern may be structured such as to wire between the IC chip 7 and the external portion or the magnetic head 5 and to fix the IC chip.

The IC chip 7 is one in which a semiconductor electronic circuit for amplifying an electric signal required for the magnetic head 5 is formed therein. It has a wiring terminal within any one of outer surfaces and a surface opposed to the surface within which the wiring terminal is formed is a heat radiating surface. In this case, the IC chip 7 may have the other object than the object of amplifying the electric signal required for the magnetic head 5. For example, it may be an IC chip aiming a drive circuit for driving an oscillating actuator and the like, and in this case, it is unnecessary to wire the IC chip 7 and the magnetic head 5.

Next, a description will be given in detail of a way of assembling the head gimbal assembly with reference to FIG. 2.

At first, terminal portions 24 of the IC chip 7 are bonded to predetermined portions of a conductive pattern 25 formed on the FPC 4 by soldering or the like so as to wire the electronic circuit portion. Next, the IC chip 7 and the conductive pattern 25 portion of the FPC 4 are coated with an insulating film 26 such as a solder resist or the like so as to secure an insulation between the wires.

Consequentially, the suspension 3 and the base load beam 6 are previously bonded by spot welding or an adhesive material. Then, the FPC 4 to which the IC chip 7 is mounted is fixed to the suspension 3 by means of an adhesive material 21 or the like. At this time, the adhesive material 21 is applied with a thickness so that a gap is formed between the suspension 3 and the FPC 4, and is partly applied not on a whole surface so that an air can flow between the suspension 3 and the FPC 4.

Further, in the suspension 3 and the base load beam 6, holes (notches) which extend through them after bonded are formed, and the IC chip 7 is projected from the holes when the FPC 4 to which the IC chip 7 is mounted is fixed. In this case, at this time, it is performed so that the side surfaces of the IC chip 7 are not in contact with the suspension 3 and the base load beam 6. Further, a thickness when the suspension 3 and the base load beam 6 are bonded together is determined so that a surface opposite to the side where the terminal portions 24 of the IC chip 7 exist protrudes is from the base load beam 6.

Finally, an adhesive material 23 having an improved heat transmission such as a silver paste or the like is applied to a whole surface of the surface opposite to the side where the terminal portions 24 of the IC chip 7 exist, and the heat radiating plate 8 is bonded. At this time, in the case that a strength is insufficient, a portion between the heat radiating plate 8 and the base load beam 6 is partly bonded by a heat insulating and electrical insulating adhesive material 22. When bonding the heat radiating plate 8 and the base load beam 6, in the same manner as that of bonding the FPC 4 to the suspension 3 mentioned above, they are partly bonded with a thickness of the adhesive material 22. Accordingly, an air flow passage is formed between the base load beam 6 and the heat radiating plate 8, whereby it is possible to obtain a desired heat radiating effect. Since the heat radiating plate 8 is set not to be in contact with the suspension 3 and the IC chip 7 itself is set not to be directly in contact with suspension 3, it is possible to prevent heat transmission to the suspension 3. Further, since a space surrounded by the suspension 3, the base load beam 6, the FPC 4 and the heat radiating plate 8 is communicated with the external portion, the respective bonding portions and members are not broken even when the air is thermally expanded in this space.

As mentioned above, since a heat generated in the IC chip 7 become hard to be transmitted to the suspension 3 and the base load beam 6, it is possible to prevent the suspension 3 and the base load beam 6 from being thermally deformed.

In the description mentioned above, a positional relation between the suspension 3 and the base load beam 6 may be replaced. When they are replaced, the FPC 4 is bonded to the base load beam 6, and the heat radiating plate 8 is bonded to the suspension 3.

The heat radiating plate 8 is formed by a thin plate made of a material which is light and has an improved heat transmission such as an aluminum or the like. The heat radiating plate 8 is a simple flat plate and is sufficient to be greater than an area of the surface opposing to the surface where the terminal portions 24 of the IC chip 7 exist. A heat radiating amount to the air at this time is substantially increased in proportion to the area of the heat radiating plate 8.

Further, when the heat radiating plate 8 is bent so as to surround the base load beam 6 as shown in FIG. 2, it is possible to effectively prevent air turbulence accompanied with the rotation of the disc in addition to an improvement of the heat radiating performance. At this time, an angle of bending is determined so that the heat radiating plate 8 is formed in an outwardly expanded shape as shown in FIG. 2. By making the structure in this manner, a rigidity of the heat radiating plate 8 is increased, and such structure contributes also to the rigidity of a whole of the head gimbal assembly. Further, a length of the bent portion at an upstream side where an air flow generated by the rotation of the disc collides with the heat radiating plate 8 is set to be as long as possible. By making the structure in this manner, it is possible to reduce a frictional force of the air when the magnetic discs rotate. It has been known by experiments that it is possible to reduce about 5% of an electric power loss of the magnetic disc apparatus due to a frictional force of the air on an average. Further, since an air flow speed in the upstream side where the air flow collides with the heat radiating plate 8 is more than two times of the flow speed in the opposite side from a numerical analysis, a rate of heat transmission becomes 1.4 times, so that it is advantageous in view of a heat radiating effect to make the upstream bent portion as long as possible.

Figure 3A:
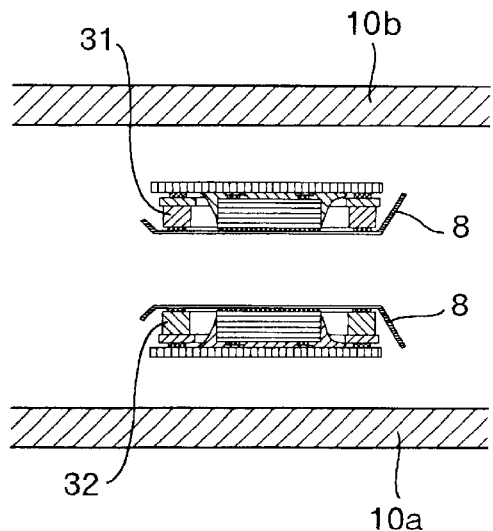
FIG. 3a is a cross sectional view, similar to FIG. 2, of the embodiment shown in FIGS. 1 and 2.
Figure 3B:
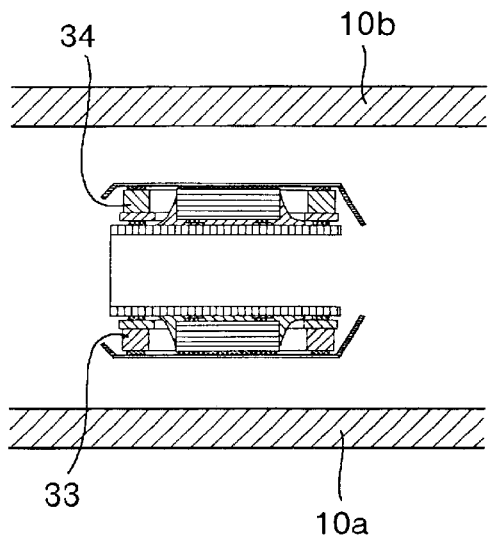
FIG. 3b is a cross sectional view, similar to FIG. 2, of a modification of the embodiment shown in FIGS. 1 and 2.

In FIGS. 3a and 3b, head gimbal assemblies 31, 32 or 33, 34 are arranged between magnetic discs 10a and 10b. FIG. 3a shows a structure which is explained in FIG. 1. That is, the FPC 4 are provided so as to oppose to the magnetic disc plates 10a and 10b. In FIG. 3b, in an inverse manner to the structure in FIG. 3a, the heat radiating plates 8 are provided so as to oppose to the magnetic disc plates 10a and 10b. Basically, the effect mentioned above can be obtained by either of the structures shown in FIGS. 3a and 3b.

Particularly, in the structure shown in FIG. 3a, a great effect can be obtained when an interval between the head gimbal assemblies 31 and 32 is greater than an interval between the head gimbal assembly 31 and the magnetic disc 10b and an interval between the head gimbal assembly 32 and the magnetic disc 10a.

Inversely, in the structure shown in FIG. 3b, a great effect can be obtained when an interval between the head gimbal assemblies 33 and 34 is smaller than an interval between the head gimbal assembly 33 and the magnetic disc 10a and an interval between the head gimbal assembly 34 and the magnetic disc 10b. The reason is that the heat radiation is effectively increased when the air amount flowing near the heat radiating plate 8 is great.

Another embodiment will be described with reference to FIGS. 4a, 4b and 4c. FIG. 4c is a view showing a heat radiating plate of the present invention, and FIGS. 4a and 4b are plan views as seen from a direction of the rotary shaft of the magnetic disc.

In these drawings, the magnetic disc 10 is mounted to the rotary shaft 11 and rotates in a direction of rotation shown by an arrow (in a counterclockwise direction in the drawings). The heat radiating plate 8 is formed in such a manner that parts of the bent portions 8a and 8b of the heat radiating plate are cut in a diagonal positional relation as shown in FIG. 4c. The structure of the other portions is the same as the embodiment already described with using FIGS. 1 to 3.

Figure 4A:
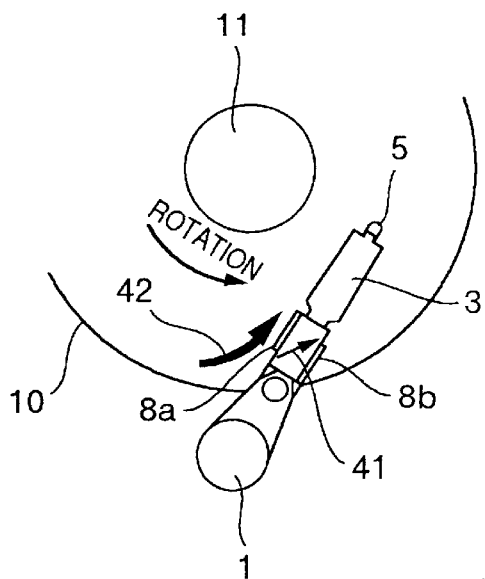
FIG. 4a is a view viewed from a rotary shaft of a disc apparatus and for explaining a modification of a heat radiation plate.

At first, in FIG. 4a, there is shown a structure in which the arm is inserted at a negative angle of incidence with respect to a direction of rotation of the magnetic disc 10. At this time, the air flow between the magnetic discs becomes as shown by an arrow 42 by an insertion of the arm, and in the periphery of the heat radiating plate 8, an air static pressure becomes a high pressure in a bent portion 8a of the heat radiating plate and a low pressure in a bent portion 8b of the heat radiating plate. At this time, as shown in FIG. 4a, a part of the side into which the air flows in the bent portion 8a of the heat radiating plate is cut. When a part of the side into which the air flows in the bent portion 8b of the heat radiating plate is cut, an air flow as shown by an arrow 41 is generated in the periphery of the IC chip 7 disposed inside the heat radiating plate 8. Due to the air flow, there is an effect that the IC chip 7 is further cooled.

Figure 4B:
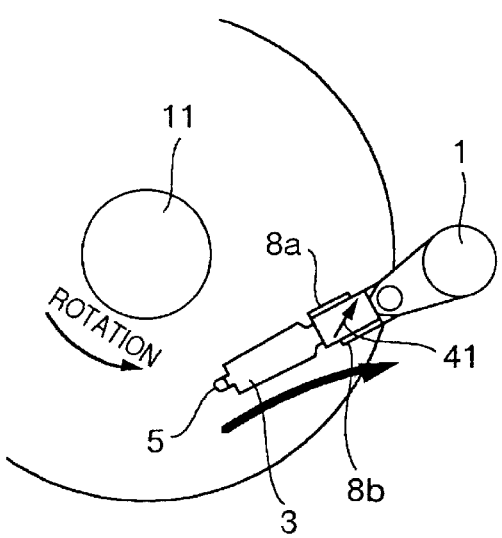
FIG. 4b is a view viewed from a rotary shaft of a disc apparatus and for explaining another modification of a heat radiation plate.
Figure 4C:
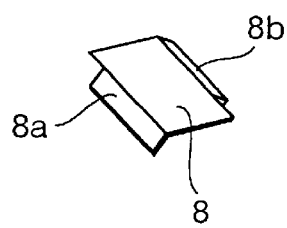
FIG. 4c is a perspective view of the modification of the heat radiation plate.

Inversely, in FIG. 4b, there is shown a structure in which the arm is inserted at a positive angle of incidence with respect to the direction of rotation of the magnetic disc 10. At this time, since the air flow between the magnetic discs is different from that of FIG. 4a, and is in a direction of flowing outside the disc along the arm as shown by the arrow 42. Therefore, the cut is provided so that the air flows on the IC chip as shown by the arrow 41.

Figure 5:
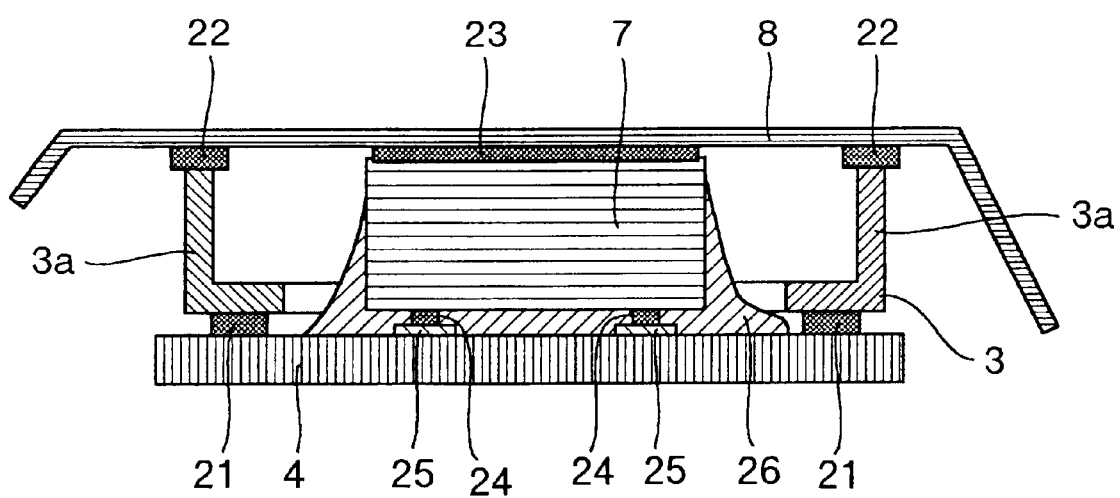
FIG. 5 is a cross sectional view, similar to FIG. 2, of another embodiment of the head supporting apparatus of the present invention.

Other embodiment of the present invention is described with reference to FIG. 5. In the present embodiment, a basic structure is the same as that explained with reference to FIG. 2. In the present embodiment, the IC chip 7 is mounted to a portion which is further closer to the head 5 than the base load beam 6. At this time, as shown in FIG. 5, both sides of the suspension 3 are bent so as to form flanges 3a. The heat radiating plate 8 and the suspension 3 are bonded at front end portions of the flanges 3a by a heat insulating and electrical insulating adhesive material 22. At this time, the air freely flows in a depth direction of FIG. 5, and therefore, it is not necessary to provide the gap described in FIG. 2. As mentioned above, the IC chip 7 can be mounted to the portion closer to the magnetic head 5 while performing a sufficient heat radiation. Further, since the suspension 3 is employed for supporting the heat radiating plate 8, there is also an effect of reducing a number of the parts in comparison with the embodiments mentioned above.

A description will be given of the other embodiment of the present invention with reference to FIGS. 6, 7 and 8.

A major difference between the present embodiment and the embodiments mentioned above exists in a structure that in the present embodiment, the opening portion is not provided in the suspension 3 and the FPC 4 having the IC chip mounted thereon is directly mounted on the suspension 8. In this case, if a heat insulating performance of the FPC is bad, the structure may be made such that the heat insulating member is provided in the IC chip mounting portion, or such that the IC chip is mounted to the heat insulating member and the FPC is separated into the head side and the rotary shaft side at the IC chip portion. The other portions may be made in the same structure as that shown in FIG. 6.

At first, the terminal portions 24 of the IC chip 7 are bonded to predetermined portions of the conductive pattern 25 formed on the FPC 4 by soldering or the like, thereby wiring the electronic circuit portion. Next, the conductive pattern 25 portion of the IC chip 7 and the FPC 4 are coated with the insulating film 26 such as the solder resist or the like so as to secure an insulation between the wires. Further, the adhesive material 23 having an improved heat transmittance such as a silver paste or the like is applied to the whole surface opposite to the surface where the terminal portions 24 of the IC chip 7 exist, thereby bonding the heat radiating plate 8. By making the structure as mentioned above, the IC mounting substrate 61 is manufactured as an independent part.

Figure 6:
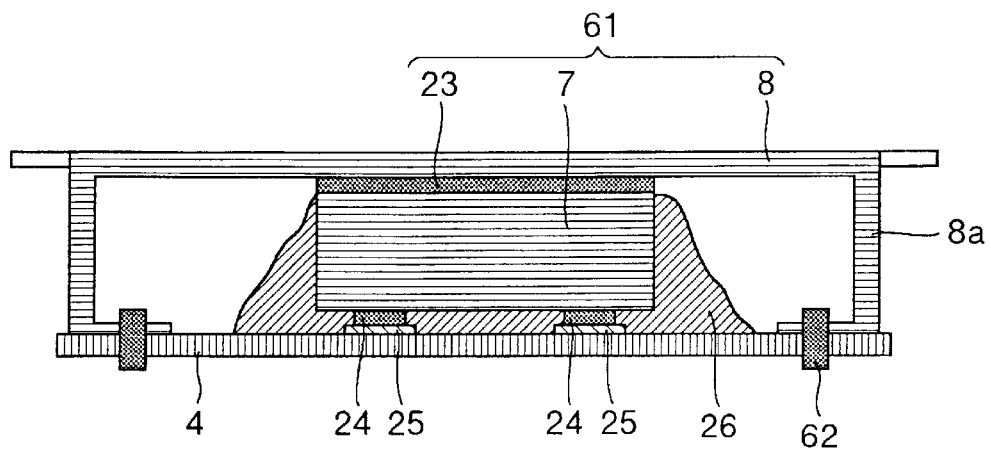
FIG. 6 is a cross sectional view, similar to FIG. 2, of still another embodiment of the head supporting apparatus of the present invention.
Figure 7:
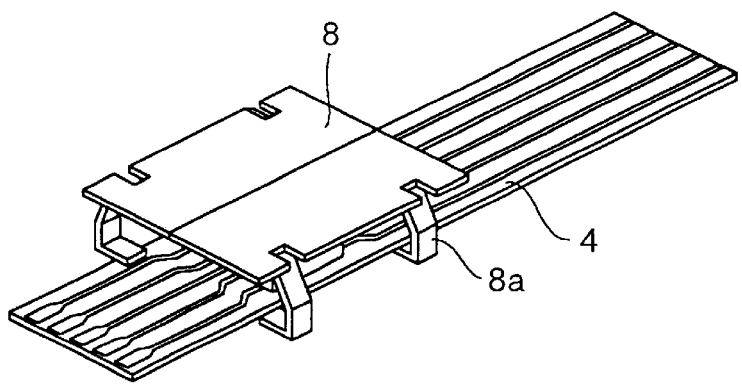
FIG. 7 is a perspective view of an IC mounting substrate in accordance with the present invention.

Further, as shown in FIGS. 6 and 7, in the case that the fixation of the heat radiating plate 8 is insufficiently performed only by bonding by means of the adhesive material 23 having an improved heat transmitting performance such as a silver paste or the like, bent portions 8a are provided in part of the heat radiating plate 8 and are fixed to the FPC 4 by fastening means 62. An adhesive material may be employed for the fastening means 62 or the fastening means may be performed by inserting the bent portions 8a of the heat radiating plate 8 to holes formed in the FPC 4 and caulking them. Further, in place of the bent portions 8a, the other member may be inserted so as to fasten while forming a gap between the heat radiating plate 8 and the FPC 4.

Further, in the case that a fixing force is sufficiently obtained only by the fastening means 62, it is preferable to directly bring the heat radiating plate into contact with the IC chip without using the adhesive material 23. When the structure is made in this manner, the heat radiating plate is directly in contact with the IC chip, so that it is possible to improve the heat radiating performance.

Figure 8:
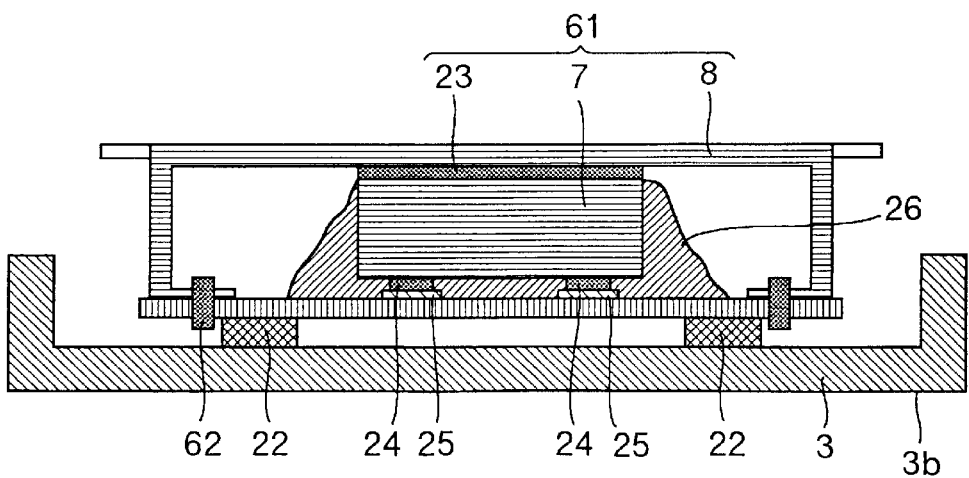
FIG. 8 is a cross sectional view, similar to FIG. 2, of the embodiment shown in FIG. 6.

Next, as shown in FIG. 8, the IC mounting substrate 61 is bonded to the suspension 3 by the binding means 22 such as an adhesive material or the like.

Since plural sets of the IC mounting substrate 61 mentioned above can be manufactured by arranging on a flat plate in accordance with a normal printed circuit board mounting method at one time, it is possible to mass produce them.

The above description is given of the case of mounting the IC chip on the FPC, however, as mentioned above, the structure may be made such that the IC chip is mounted on the heat insulating member, and in the case that the calorific power of the IC chip is small, there can be employed a structure of not being brought into contact with the suspension as shown in FIG. 1 without disposing the heat radiating plate in the IC chip, and a structure that the IC chip is provided on the heat insulating substrate and the assembly is mounted to the suspension so as to achieve a sufficient heat insulation.

In accordance with the present invention, even when the IC chip is arranged in the suspension portion near the magnetic head, it is possible to restrict a thermal deformation of the suspension due to heat generation of the IC chip. Accordingly, it is possible to improve a data transmission speed by reducing the distance between the magnetic head for reading/writing to the amplifying circuit without deteriorating the positioning accuracy due to the thermal deformation.

What is claimed is:

1. A magnetic head supporting apparatus comprising:
   a magnetic head for reading and writing information on a magnetic disc;
   a slider having said magnetic head; and
   a suspension for supporting said slider,
   wherein an IC chip for controlling a signal of said magnetic head is mounted on a first surface of a heat insulating substrate, and a second surface of said heat insulating substrate opposite to the first surface thereof is mounted to said suspension; and
   wherein a heat radiating plate is mounted on a second surface of said IC chip opposite to a first surface of said IC chip to which said heat insulating substrate is mounted.

2. A magnetic head supporting apparatus as claimed in claim 1, wherein said heat insulating substrate comprises a flexible printed circuit board (FPC) for wiring.

3. A magnetic head supporting apparatus as claimed in claim 1, wherein said heat radiating plate is provided with bent portions in both end sides so as to surround said suspension arm portion.

4. A magnetic head supporting apparatus as claimed in claim 3, wherein said bent portions of said heat radiating plate are formed longer at an upstream side in which an air flow generated by rotation of the magnetic disc collides with said heat radiating plate, than at a downstream side.

5. A magnetic head supporting apparatus as claimed in claim 4, wherein in the case that said suspension is inserted at a negative angle of incidence with respect to a direction of rotation of the magnetic disc, a part of the bent portion of said heat radiating plate is cut out in a corner portion near the rotary shaft of the arm at an upstream side and in a corner portion apart from the rotary shaft at a downstream side, and in the case that said suspension is inserted at a positive angle of incidence with respect to a direction of rotation of the magnetic disc, a part of the bent portion of said heat radiating plate is cut out in a corner portion apart from the rotary shaft of the arm at an upstream side and in a corner portion near the rotary shaft at a downstream side.

6. A magnetic head supporting apparatus as claimed in claim 3, wherein in the case that said suspension is inserted at a negative angle of incidence with respect to a direction of rotation of the magnetic disc, a part of the bent portion of said heat radiating plate is cut out in a corner portion near the rotary shaft of the arm at an upstream side and in a corner portion apart from the rotary shaft at a downstream side, and in the case that said suspension is inserted at a positive angle of incidence with respect to a direction of rotation of the magnetic disc, a part of the bent portion of said heat radiating plate is cut out in a corner portion apart from the rotary shaft of the arm at an upstream side and in a corner portion near the rotary shaft at a downstream side.

7. A magnetic disc apparatus comprising:
  a plurality of magnetic discs on which information is recorded;
  a motor for rotating said magnetic discs stacked on a rotary shaft;
  magnetic heads for recording and reproducing the information on said magnetic discs, said magnetic heads being provided so as to oppose to said magnetic discs; and
  a plurality of magnetic head supporting apparatus each comprising an arm portion for pivotally movement, and a suspension for mounting thereon a slider having said magnetic head;
  wherein said magnetic head supporting apparatus is structured such that an IC chip for controlling a signal of said magnetic head has a surface thereof mounted on a first surface of a heat insulating substrate, and a second surface of said heat insulating substrate opposite to the first surface thereof is mounted to said suspension; and
  wherein a heat radiating plate is mounted on another surface of said IC chip opposite to the surface of said IC chip to which the first surface of said heat insulating substrate is mounted.

8. A magnetic disc apparatus as claimed in claim 7, wherein when an interval between adjacent two magnetic head supporting apparatus is greater than an interval between one of the two magnetic head supporting apparatus and one of the magnetic discs associated with said one of the two magnetic head supporting apparatus, heat radiation plates of said two magnetic head supporting apparatus are positioned so as to face each other, and when an interval between adjacent two magnetic head supporting apparatus is smaller than an interval between one of the two magnetic head supporting apparatus and one of the magnetic discs associated with said one of the two magnetic head supporting apparatus, heat radiation plates of said two magnetic head supporting apparatus are positioned so as to face associated magnetic discs, respectively.

9. A magnetic head supporting apparatus comprising a head for recording/reproducing information on/from a magnetic disc and an arm portion for supporting said head,
  wherein a notch is provided in said arm portion and an IC chip is supported on a flexible print circuit board with wiring terminals thereof connected to the flexible print circuit board so that the IC chip is located in said notch and a heat radiating plate is bonded to a surface of the IC chip opposite to said terminals by a heat-conductive adhesive and is bonded to said arm portion by a non-heat-conductive adhesive.

10. A magnetic head supporting apparatus as claimed in claim 9, wherein said heat radiating plate is provided with bent portions in both end sides so as to surround said arm portion.

11. A magnetic head supporting apparatus as claimed in claim 10, wherein said bent portion of the heat radiating plate is formed longer at an upstream side in which an air flow generated by rotation of the magnetic disc collides with said heat radiating plate, than at a downstream side.

12. A magnetic head supporting apparatus as claimed in claim 11, wherein in the case that said arm portion is inserted at a negative angle of incidence with respect to a direction of rotation of the magnetic disc, a part of the bent portion of said heat radiating plate is cut out in a corner portion near a rotary shaft of the arm portion at an upstream side and in a corner portion apart from the rotary shaft at a downstream side, and in the case that said arm portion is inserted at a positive angle of incidence with respect to a direction of rotation of the magnetic disc, a part of the bent portion of said heat radiating plate is cut out in a corner portion apart from the rotary shaft of the arm portion at an upstream side and in a corner portion near the rotary shaft at a downstream side.

* * * * *